INVENTOR.
DONALD J. ROTIER

ATTORNEY

INVENTOR.
DONALD J. ROTIER

BY Bruce C Lutz

ATTORNEY

INVENTOR.
DONALD J. ROTIER
BY Bruce C Lutz
ATTORNEY

INVENTOR.
DONALD J. ROTIER

BY Bruce C Lutz

ATTORNEY

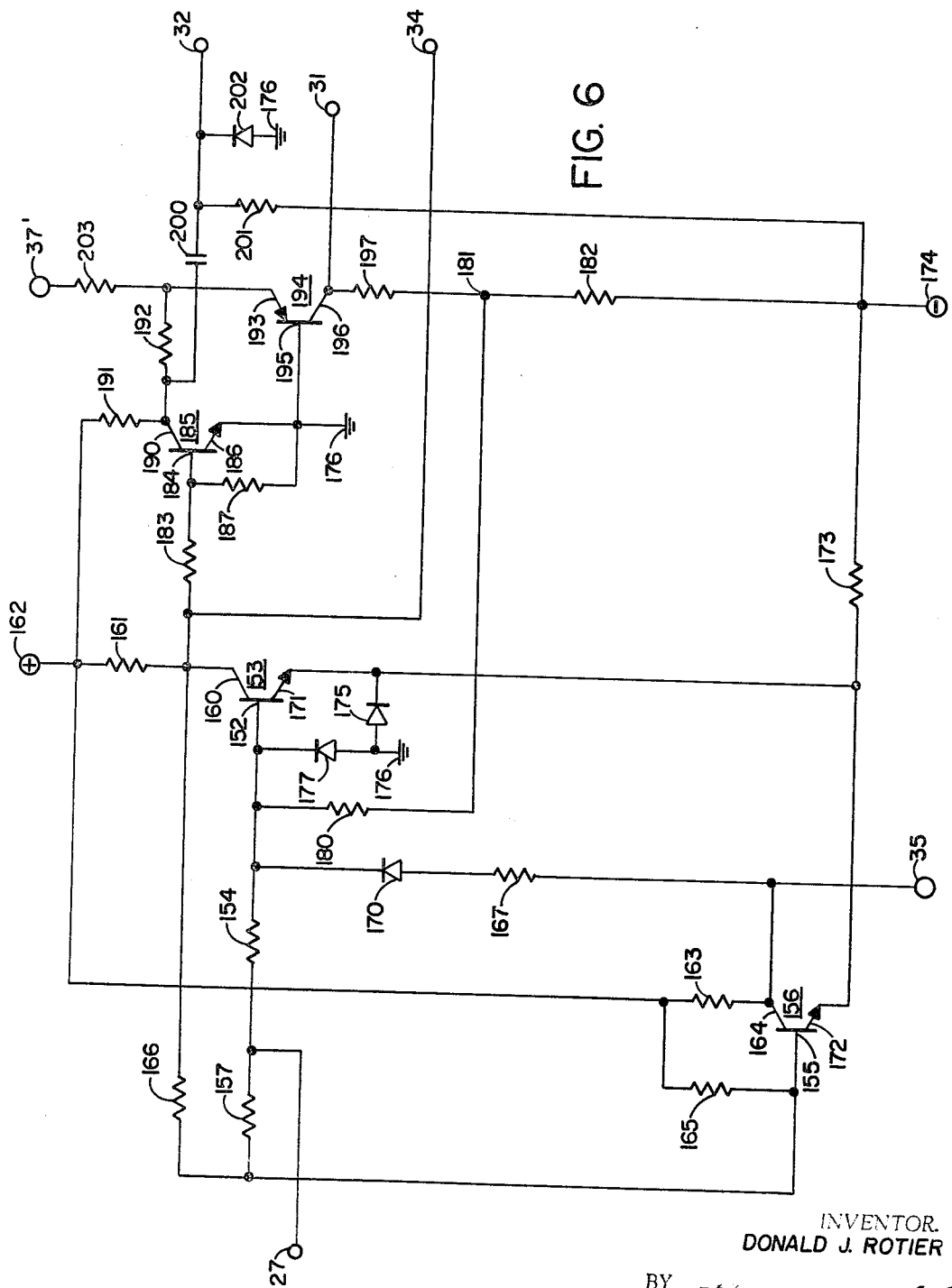

United States Patent Office 3,510,683
Patented May 5, 1970

3,510,683
CONTROL APPARATUS HAVING INTEGRATING MEANS FOR SYNCHRONIZING AND ADJUSTING THE PHASE OF INPUT AND COUNTER SIGNALS
Donald J. Rotier, St. Paul, Minn., assignor to Honeywell Inc., Minneapolis, Minn., a corporation of Delaware
Filed Oct. 2, 1967, Ser. No. 672,359
Int. Cl. H03k 5/20
U.S. Cl. 307—232                                10 Claims

ABSTRACT OF THE DISCLOSURE

A synchronizer wherein information or a signal is stored in the phase of a counter is shown. An error signal is generated by comparing the phase of the counter to the phase of an input signal which is used either to adjust the phase of the counter (synchronize mode) or as a control signal (hold mode).

CROSS REFERENCE TO RELATED APPLICATION

Figure 1:
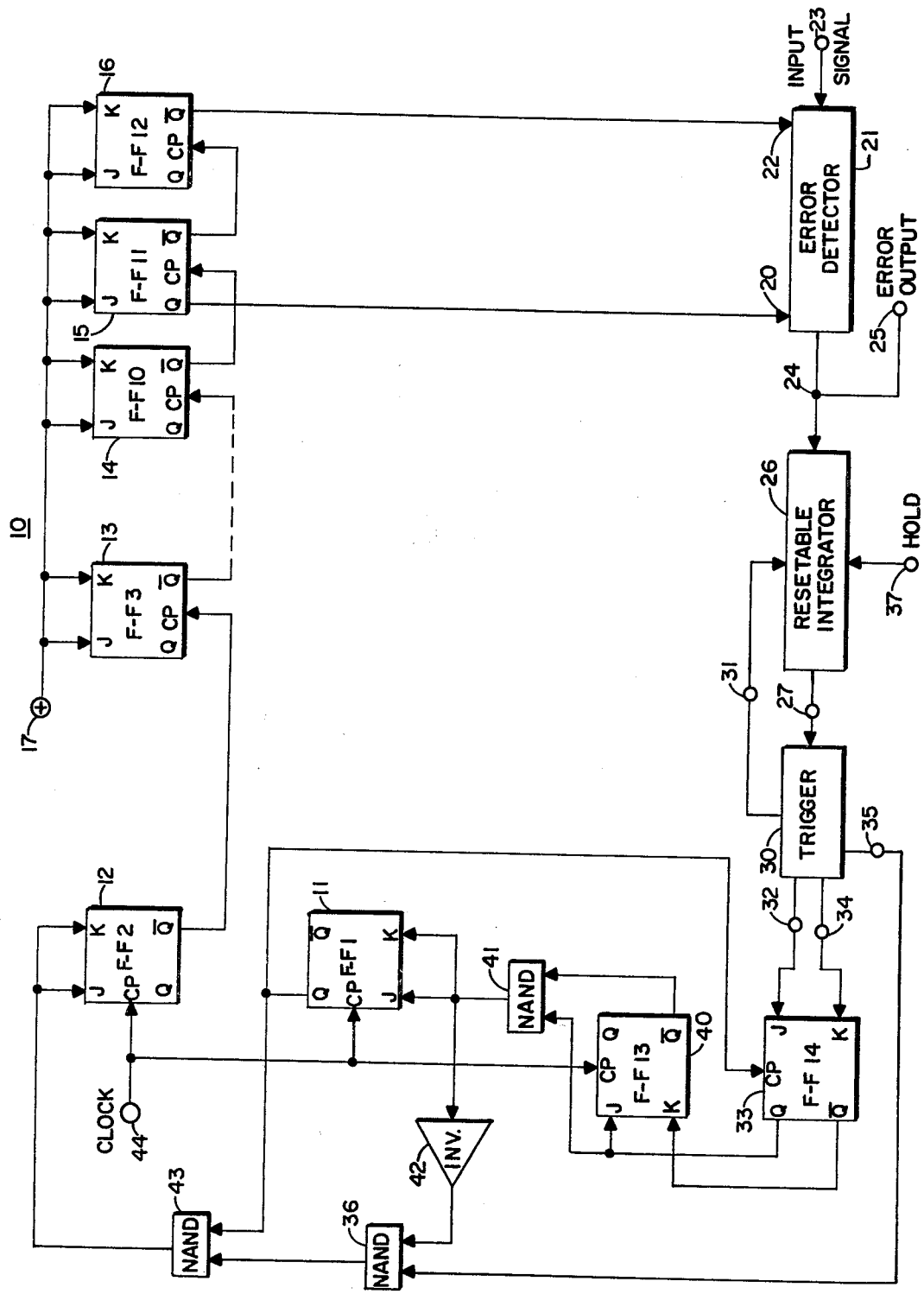

This invention is related to and is an improvement over the invention disclosed in an application of Rufus Allen, Jr., entitled Control Apparatus, Ser. No. 522,103, filed Jan. 21, 1966, and assigned to the same assignee as the present invention.

SUMMARY OF THE INVENTION

A synchronizer is defined as a device which tracks an input signal and stores information or a signal corresponding to the input signal during a "synchronize" mode of operation and provides a control or output signal during a "hold" mode of operation where the control signal is derived from the difference between the stored signal and the input signal. Synchronizers are well known devices which are commonly used in aircraft control systems.

This invention is similar in purpose to the invention disclosed in the above-referenced copending application; however, it is an improvement thereover. The synchronizer disclosed in the above-referenced application was found to operate so fast that it would sometimes synchronize to errors so that when the synchronizer was switched to the hold mode of operation, it would actually lock on an error signal thereby providing an erroneous control signal. In this invention the speed at which the synchronizer operates is slowed by integrating the feedback or error signal which is used to adjust or update the stored information.

In this invention information indicative of a condition is stored in the phase of an output signal of a counter which is driven at a substantially constant speed. The phase of an input signal is compared to the phase of of the last stage of the counter and a feedback or error signal is generated which is proportional to the phase difference. This error signal is integrated in an integrator. The output of the integrator is applied to a trigger circuit which triggers when the integrator output exceeds a predetermined amplitude. The integrator integrates both positive and negative error signals and the trigger provides advance or retard signals depending upon the polarity of the integrator output. When a retard signal is provided by the trigger it means that the phase of the counter is leading the phase of the input signal. The retard signal causes the counter to skip or not count one clock pulse so that its phase is retarded. When an advance signal is provided by the trigger, the counter is caused to count one clock pulse in the second stage thereby advancing the phase of the counter by one count or one pulse. Each time the trigger provides an output signal, the counter is advanced or retarded by one count.

The trigger resets the integrator each time it triggers and if an error signal remains, the integrator again provides an output signal.

The synchronizing speed can be changed by changing the rate of integration. The requirement for a "fast" clock in the above-referenced application is eliminated in this invention by inserting one clock pulse into the second stage of the counter when an advance signal occurs.

The integrator by integrating the error signal slows the rate of synchronization so that the synchronizer does not lock on phase errors in the input signal. Furthermore, it will normally be expected that phase errors in the input signal will be equal and opposite over time so that integrating the error will tend to smooth out or eliminate the phase errors.

During the hold mode of operation the integrator is inhibited so that it does not provide an output signal. The error signal is used as an output control signal.

In the above-referenced application a trim control circuit was shown. In this invention a separate trim control circuit is not necessary because the trim control signal can be applied to the input of the synchronizer.

Accordingly, it is an object of this invention to provide an improved synchronizer for use in control systems.

Figure 2A:
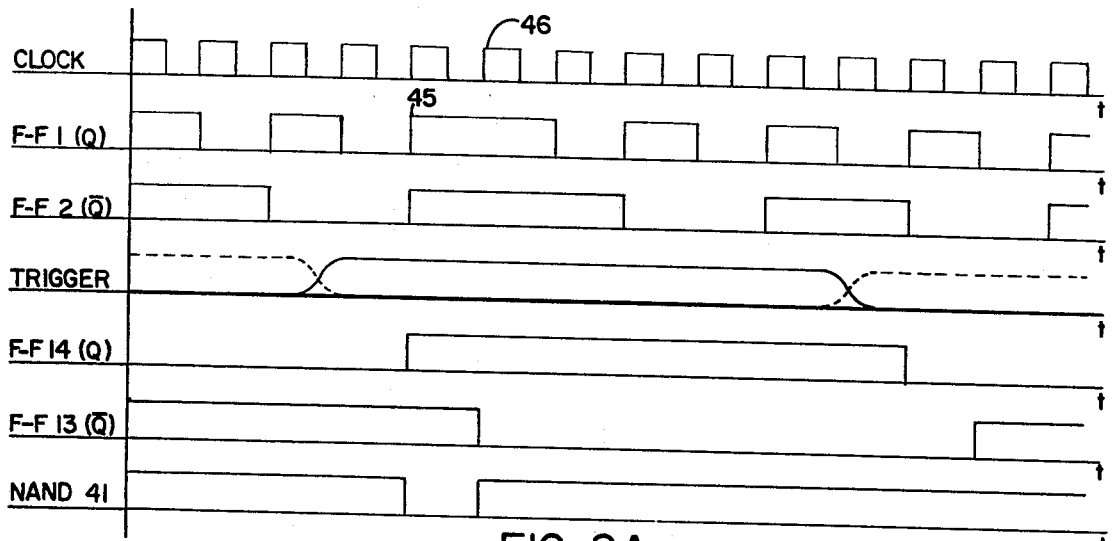
Figure 2B:
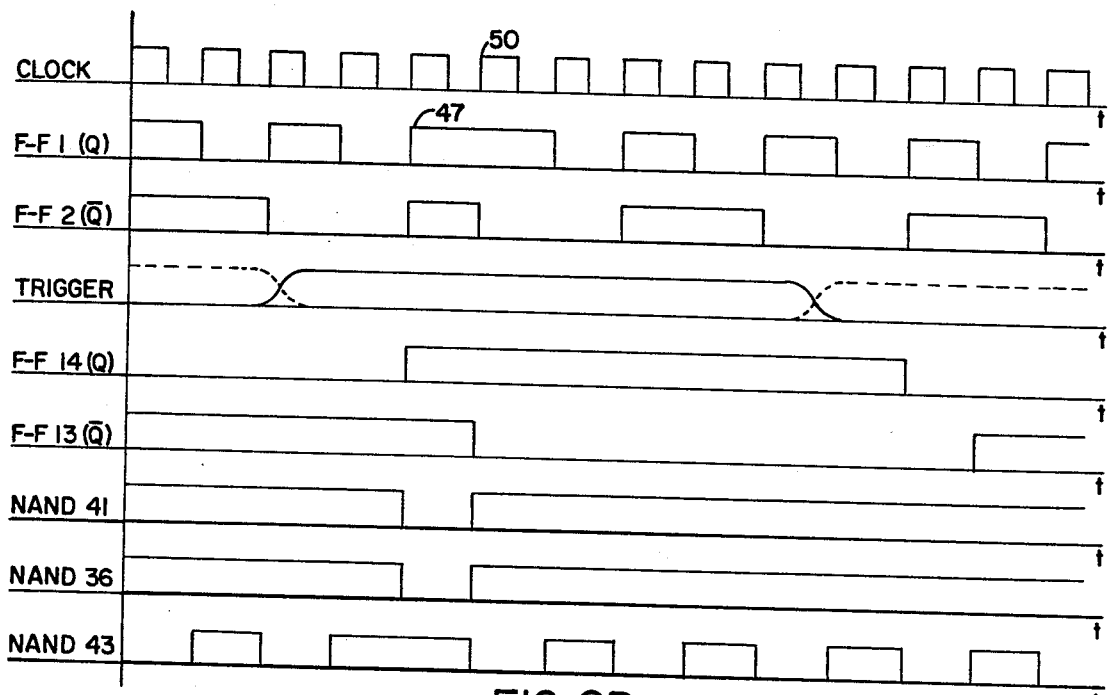
Figure 3:
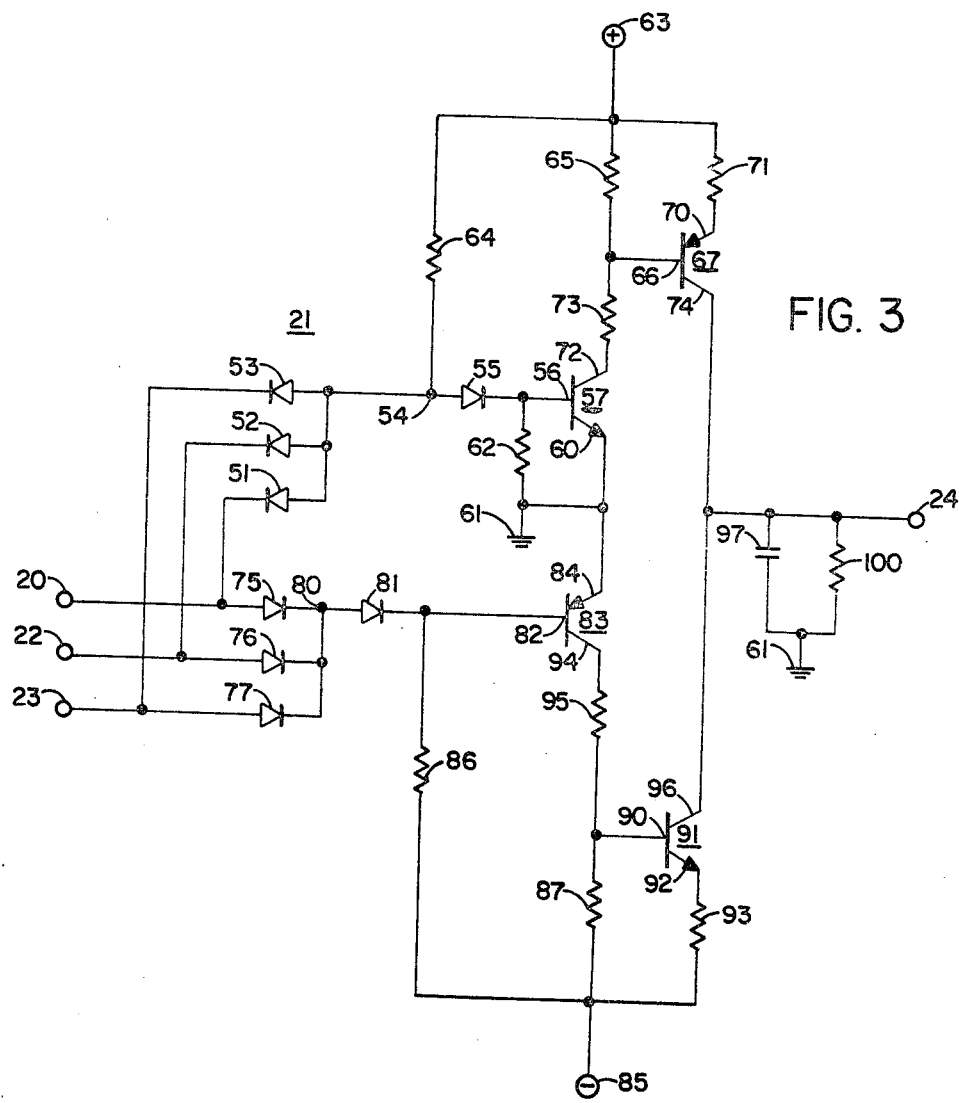
Figure 4A:
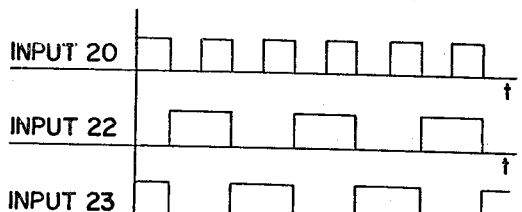

This object and other objects and advantages of this invention will become evident to those skilled in the art upon a reading of this specification and the appended claims in conjunction with the drawings, of which:

FIG. 1 is a block diagram of this invention;
FIGS. 2A and 2B are graphs showing various circuit waveforms;
FIG. 3 is a circuit schematic of an error detector;
FIGS. 4A, 4B, 4C, 4D, 4E and 4F are graphs showing various waveforms to aid in the explanation of FIG. 3;
FIGS. 5A and 5B are circuit schematics of integrators which can be used in FIG. 1; and
FIG. 6 is a circuit schematic of a trigger circuit.

FIGS. 1 AND 2

In FIG. 1 there is shown an adjustable storage means or counter 10 which has 12 stages. Each stage is a J–K flip-flop. A J–K flip-flop is a device which operates as a normal flip-flop when a positive voltage is coupled to both of the J and K inputs. The flip-flop is triggered by the leading edge of pulses applied to a CP or clock pulse input. The outputs are labeled Q and $\bar{Q}$. When a positive voltage is coupled to only the J input, clock pulses will drive the flip-flop into its $Q=1$ state where it will remain. When a positive voltage is coupled to only the K input, the flip-flop will be driven to its $\bar{Q}=1$ state where it will remain. The first stage of counter 10 is flip-flop 11 which is labeled F–F1. The second stage is flip-flop 12 which is labeled F–F2, and the third stage is flip-flop 13 which is labeled F–F3. Stages 4–9 are not shown since they are identical to flip-flop 13. Counter stage 10 is a flip-flop 14 which is labeled F–F10, stage 11 is a flip-flop 15 which is labeled F–F11, and stage 12 is a flip-flop 16 which is labeled F–F12. A source of positive voltage 17 is connected to the J and K inputs of each of the flip-flops in stage 3 through stage 12. The $\bar{Q}$ output of flip-flop 12 is coupled to the CP input of flip-flop 13. The $\bar{Q}$ output of each succeeding flip-flop is coupled to the CP input of the following stage.

The Q output of flip-flop 15 is coupled to an input terminal 20 of an error or phase detector 21. The $\bar{Q}$ output of flip-flop 16 is coupled to an input terminal 22 of detector 21. An input means or terminal 23 labeled INPUT SIGNAL is connected to another input of detector 21. An output of detector 21 is connected to a terminal or junction point 24 which is further connected to an output means or terminal 25 labeled ERROR OUTPUT. Terminal 24 is further connected to an input of an integrating means or resettable integrator 26. Integrator 26 has an output connected to a terminal or junction point 27 which is further connected to an input of a discriminating means or trigger circuit 30. An input means or terminal 37 labeled HOLD is connected to an input of integrator 26. Trigger circuit 30 has an output connected to a terminal or junction point 31 which is further connected to a reset input of integrator 26, an output connected to a terminal or junction point 32 which is further connected to a J input of a flip-flop 33, an output connected to a terminal or junction point 34 which is further connected to a K input of flip-flop 33, and an output connected to a terminal or junction point 35 which is further connected to a first input of a NAND gate 36. Flip-flop is labeled F–F14.

The $\overline{Q}$ output of flip-flop 33 is connected to a K input of a flip-flop 40 labeled F–F13. The Q output of flip-flop 33 is connected to the J input of flip-flop 40 and is further connected to the first input of a NAND gate 41. The $\overline{Q}$ output of flip-flop 40 is connected to a second input of NAND gate 41. An output of NAND gate 41 is connected to the J and K inputs of flip-flop 11 and is further connected to an input of an inverter 42 which has an output which is connected to a second input of NAND gate 36. An output of NAND gate 36 is connected to a first input of a NAND gate 43 which has an output connected to the J and K inputs of flip-flop 12. The Q output of flip-flop 11 is connected to the CP input of flip-flop 33 and is further connected to a second input of NAND gate 43. An input terminal 44 labeled CLOCK is connected to the CP inputs of flip-flops 11, 12, and 40.

The operation of this invention will be described with reference to the pitch attitude channel of an aircraft autopilot. However, it is to be realized that this invention can be used in many other applications as well. When the pilot is maneuvering the airplane it can be assumed that the pitch attitude is continuously changing. The input signal which is applied at terminal 23 is a phase modulated 400 Hertz signal where the phase of the signal is modulated in accordance with the pitch attitude. In the above-referenced application a scheme for deriving such a signal from a 3-wire synchro output was illustrated. During the synchronizing mode of operation the phase of counter 10 is changed (advanced or retarded) so that the output signal from flip-flop 16 tracks the input signal. The output signal from flip-flop 16 should also be 400 Hertz to facilitate phase comparison; therefore, the clock frequency should be $2^{12} \times 400$ Hertz.

Figure 5A:
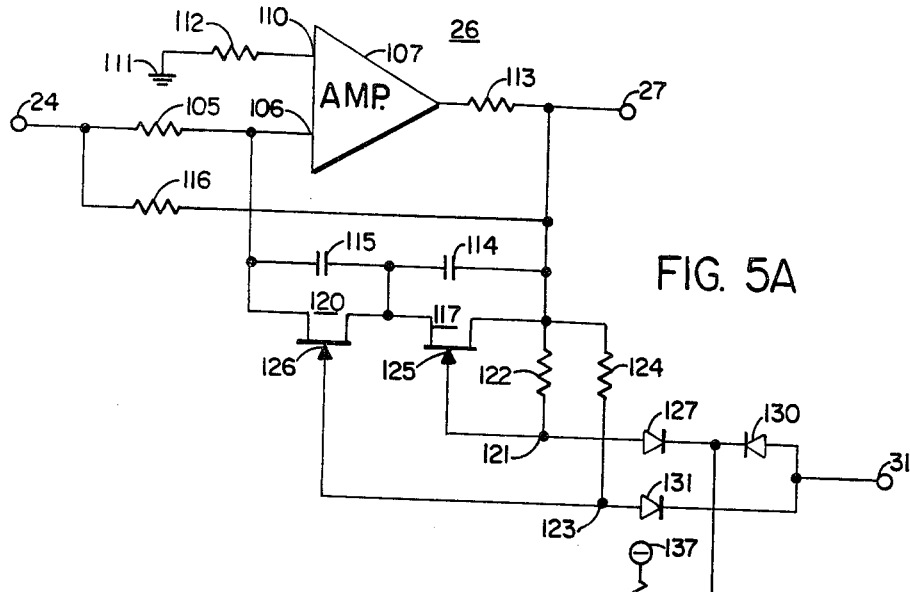
Figure 5B:
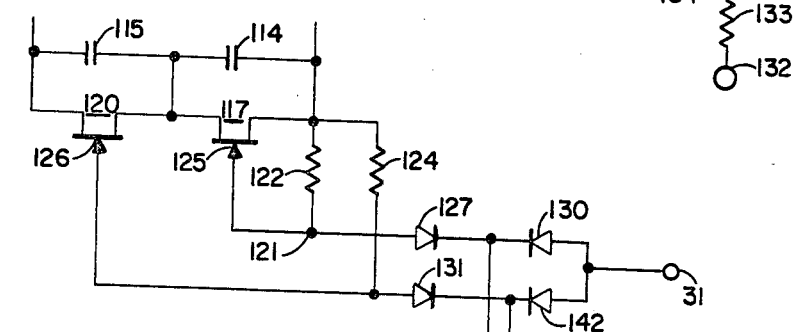
Figure 5B:
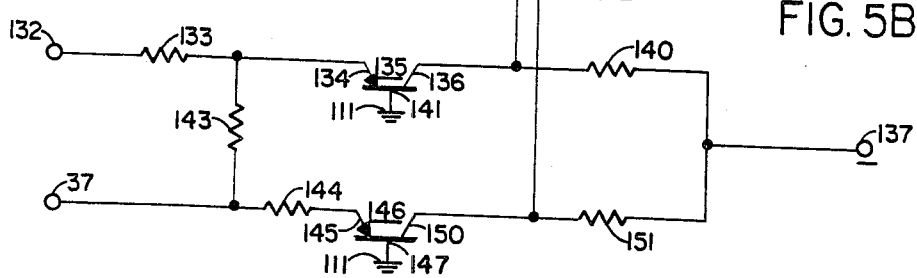

Assume that the output signal from flip-flop 16 and the input signal applied at terminal 23 are exactly in phase so that there is no error signal at terminal 24. Integrator 26 will not be providing an output signal so that trigger circuit 30 will be in its initial or untriggered condition. The initial condition for trigger circuit 30 is that the signal at terminal 32 is a "0," the signal at terminal 34 is a "1," and the signal at terminal 35 is a "0." It should be noted that the "1" and "0" logic signals can be any voltage levels provided the circuitry can distinguish between "1" and "0" signals. Also, the signal levels can change between various points in the circuitry. In the graphs in FIGS. 2 and 5 a "1" is shown as a positive level and "0" is shown as a zero or ground level voltage.

Since the signal on lead 32 is a "0" and the signal on lead 34 is a "1," flip-flop 33 will be driven to its $\overline{Q}=1$ state and will remain there. Flip-flop 40 will be driven to its $\overline{Q}=1$ state and will remain there. Thus, the inputs to NAND gate 41 are a "0" from the Q output of flip-flop 33 and a "1" from the $\overline{Q}$ output of flip-flop 40. A NAND gate is defined in the gate which provides a "1" output signal when one or more input signals are "0." When all input signals are "1," the output signal is a "0." Thus, NAND gate 41 provides a "1" output signal which energizes both the J and K inputs of flip-flop 11. Inverter 42 provides a "0" output signal. Since both of the inputs signals to NAND gate 36 are "0," NAND gate 36 provides a "1" output signal to NAND gate 43. Each clock pulse from terminal 44 toggles or switches flip-flop 11 to its opposite state. When the Q output of flip-flop 11 is a "1," NAND gate 43 provides a "1" output signal to the J and K inputs of flip-flop 12. Thus, when flip-flop 11 is in its $Q=1$ state, flip-flop 12 will not respond to the next succeeding clock pulse. When flip-flop 11 is in its $Q=0$ state, NAND gate 43 provides a "1" output to the J and K inputs of flip-flop 12 so that flip-flop 12 will reverse its state on the next succeeding clock pulse. As was mentioned before each time a leading edge of a pulse is generated at the $\overline{Q}$ output of flip-flop 12, flip-flop 13 reverses its state. The remaining stages of the counter operates as a normal counter.

FIG. 2A is a logic and timing diagram which illustrates the logic to generate a retard signal to retard counter 10. When the counter output from flip-flop 16 is leading the phase of the input signal it is desired to retard the counter by skipping or not counting at least one clock pulse. Error detector 21 provides a negative error voltage to integrator 26 which provides a positive going output signal in response to the negative error signal. This positive going integrator output causes trigger 30 to switch when a predetermined triggering level or threshold is reached. Trigger 30 provides a "1" signal on lead 32 and a "0" signal on lead 34. The signal on lead 35 remains a "0." The signals on lead 32 and 34 are illustrated in FIG. 2A on the curve labeled TRIGGER. The signal on lead 32 is shown by a solid line and the signal on lead 34 is shown by a dashed line. Flip-flop 33 remains in its initial state until the next successive leading edge of a pulse occurs at the Q output of flip-flop 11. This leading edge is the leading edge of pulse 45 on the curve labeled F–F1 (Q). When the leading edge of pulse 45 occurs, flip-flop 33 reverses its state to $Q=1$ ($\overline{Q}=0$). The "1" output signal at the Q output of flip-flop 33 is coupled to the J input of flip-flop 40 and to one input of NAND gate 41. The output of NAND gate 41 goes to a "0" so that flip-flop 11 does not count the next succeeding clock pulse which is illustrated as pulse 46 on the curve labeled CLOCK. Clock pulse 46 is also coupled to the CP input of flip-flop 40 and causes flip-flop 40 to reverse its state so that its $\overline{Q}$ output goes to "0." The $\overline{Q}$ output of flip-flop 40 is illustrated in the curve labeled F–F13 ($\overline{Q}$). At this point NAND gate 41 again provides a "1" output so that flip-flop 11 counts the next successive clock pulse after pulse 46. The output of inverter 42 switches to a "1" output for one clock period; however, NAND gate 43 provides a continuous "1" output since the signal on lead 35 is a "0."

When trigger 30 triggers, it provides a reset output on lead 31 to integrator 26 which resets integrator 26. When the output from integrator 26 decreases to a predetermined level, trigger 30 switches back to its initial state. In FIG. 2A note that in the curve labeled TRIGGER the waveforms switch back to their initial conditions. The length of time that output 32 remains "1" depends upon the time it takes for integrator 26 to reset and for trigger 30 to revert to its initial condition. When trigger 30 reverts to its initial condition, flip-flop 33 is switched to its $Q=0$ ($\overline{Q}=1$) state by the leading edge of the next succeeding pulse at the Q output of flip-flop 11. After flip-flop 33 reverses its state, the next succeeding clock pulse causes flip-flop 40 to reverse its state to $\overline{Q}=1$. For a short time both inputs to NAND gate 41 are "0," but NAND gate 41 provides a continuous "1" output signal.

Now assume that the output from counter 10 is lagging the phase of the input signal applied at input terminal 23. It is now desired to provide an advance pulse which advances the phase of counter 10. Error detector 21 provides a positive output signal at terminal 24 which is integrated by integrator 26 to provide a negative going signal on lead 27. This negative signal causes trigger 30 to switch when the signal exceeds a predetermined magnitude or threshold level. A negative signal causes trigger 30 to provide a "1" signal on lead 32 and a "0" signal on lead 34 the same as for a positive output from integrator 26. However, a negative input to trigger 30 causes trigger 32 to provide a "1" signal on lead 35 which is coupled to NAND gate 36. The waveforms on leads 32 and 34 are illustrated in FIG. 2B by the curve labeled TRIGGER. The solid line represents the signal on lead 32 and the dashed line represents the signal on lead 34. Flip-flop 33 is switched to its $Q=1$ ($\overline{Q}=0$) state by the leading edge of pulse 47 from the Q output of flip-flop 11. At this time both inputs to NAND gate 41 are "1" so that NAND gate 41 provides a "0" output signal. Inverter 42 provides a "1" output signal when NAND gate 41 provides a "0" output signal. Thus, "1" signals are applied to both inputs of NAND gate 36 so that NAND gate 36 provides a "0" output signal to NAND gate 43. NAND gate 43 provides a "1" output signal to the J and K inputs of flip-flop 12. The waveforms of NAND gates 41, 36, and 43 are illustrated in FIG. 2B. The next succeeding clock pulse is clock pulse 50. This clock pulse causes flip-flop 40 to reverse its state to $\overline{Q}=0$; however, flip-flop 11 does not reverse its state since NAND gate 41 was providing a "0" output signal. Since NAND gate 43 was providing a "1" output signal, clock pulse 50 causes flip-flop 12 to reverse its state. The $\overline{Q}$ output of flip-flop 12 is illustrated in the curve labeled F-F2 ($\overline{Q}$). After flip-flop 40 reverses its state, NAND gate 41 again provides a "1" output signal so that succeeding clock pulses are counted as before by flip-flops 11 and 12. When trigger 30 resets integrator 26 and switches back to its initial state, flip-flop 33 again switches to its $Q=0$ state and the next succeeding clock pulse switches flip-flop 40 to its $\overline{Q}=1$ state.

It should be noted that each time trigger 30 switches in response to an output signal from integrator 26, counter 10 is advanced or retarded by one count. If an error signal remains at terminal 24, integrator 26 will again integrate to switch trigger circuit 30. It should also be noted that with arrangement shown in FIG. 1, counter 10 essentially counts one clock pulse twice in response to an advance signal. Pulse 50 of FIG. 2B is the pulse which is counted twice since it forces flip-flop 12 to change state even though flip-flop 11 does not change state.

FIGS. 3 AND 4

FIG. 3 is a circuit schematic of error detector 21 and FIG. 4 illustrates various input signal combinations and the corresponding output signals. Input terminals 20, 22, and 23 are the same as similar numbered terminals in FIG. 1. Input terminal 20 is connected to a cathode of a diode 51. Input terminal 22 is conected to a cathode of a diode 52. Input terminal 23 is connected to a cathode of a diode 53. The anodes of diodes 51-53 are connected to a junction point 54 which is further connected to the anode of a diode 55. The cathode of diode 55 is connected to a base 56 of a transistor 57. Transistor 57 has an emitter 60 which is connected to a common conductor or ground 61. Base 56 is connected by means of a resistor 62 to ground 61. A source of positive potential 63 is connected by means of a resistor 64 to junction point 54 and by means of a resistor 65 to a base 66 of a transistor 67. Transistor 67 further has an emitter 70 which is connected by means of a resistor 71 to source 63. A collector 72 of transistor 57 is connected by means of a resistor 73 to base 66 of transistor 67. A collector 74 of transistor 67 is connected to a terminal 24 which is the same as terminal 24 of FIG. 1. Transistor 57 is shown as an NPN transistor and transistor 67 is shown as a PNP transistor. Those skilled in the art will realize that this invention is not limited to the particular types of transistors used and the specific circuit construction.

Input terminal 20 is further connected to the anode of a diode 75. Input terminal 22 is further connected to the anode of a diode 76. Input terminal 23 is further connected to the anode of a diode 77. The cathodes of diodes 75-77 are connected to a junction point 80 which is further connected to the anode of a diode 81 which has its cathode connected to a base 82 of a transistor 83. Transistor 83 is shown as a PNP transistor. An emitter 84 of transistor 83 is connected to ground 61. A source of negative potential 85 is connected by means of resistor 86 to base 82 of transistor 83 and is further connected by means of resistor 87 to a base 90 of a transistor 91. Transistor 91 is shown as an NPN transistor. Transistor 91 further has an emitter 92 which is connected by means of resistor 93 to negative source 85. A collector 94 of transistor 83 is connected by means of resistor 95 to base 90 of transistor 91. A collector 96 of transistor 91 is connected to output terminal 24. Output terminal 24 is connected to ground 61 by means of a parallel combination of a capacitor 97 and a resistor 100. Capacitor 97 and resistor 100 comprise a filter for smoothing the output from error detector 21.

The operation of error detector 21 will be explained with reference to the graphs of FIG. 4. In FIG. 4A the Q output from flip-flop 15 is shown in the curve labeled INPUT 20. The $\overline{Q}$ output of flip-flop 16 is shown in the curve labeled INPUT 22. The signal applied at input terminal 23 is shown in the curve labeled INPUT 23. Note that the output signal from flip-flop 16 and the input signal are nominally of the same frequency. In an aircraft control system it is convenient to use 400 Hertz as the signal frequency. The output signal from flip-flop 15 is exactly twice the frequency of the output signal from flip-flop 16. Note that in FIG. 4A one or more of the input signals is always a "0" and one or more of the input signals is always a "1".

Referring again to FIG. 3, it is seen that when at least one of the input signals is a "0" (which for the purposes of FIG. 3 is ground or negative), junction point 54 is held at a low potential. Diode 55 compensates for any voltage drop across diodes 51-53 so that transistor 57 will be OFF. When transistor 57 is OFF, the potential of collector 72 will be high so that the potential of base 66 of transistor 67 will be approximately the same as the potential of emitter 70. Therefore, transistor 67 will be OFF.

It was also noted that at least one of the input signals will always be a "1" (which for the purposes of FIG. 3 is defined as a positive voltage). The positive potentials applied at terminals 20, 22, and 23 will be coupled through diodes 75-77 and diode 81 to base 82 of transistor 83 to hold transistor 83 OFF. When transistor 83 is OFF, transistor 91 also will be OFF. Accordingly, when the output signal from flip-flop 16 is exactly in phase with the input signal applied at terminal 23, there will be no error signal at terminal 24.

Figure 4B:
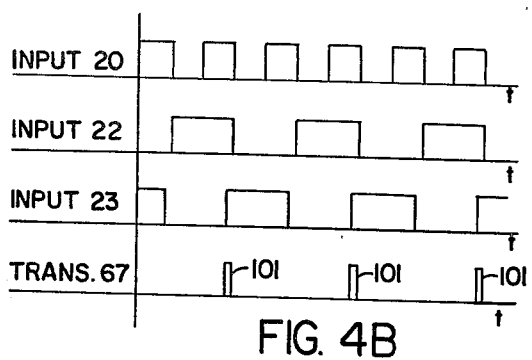

FIG. 4B shows the conditions which prevail when the phase of the output signal from flip-flop 16 of counter 10 is lagging the phase of the input signal applied at terminal 23. As was mentioned above, it is desired to generate an advance signal so that the phase of the counter is advanced. As is illustrated in FIG. 4B, at least one of the input signals is always positive so that transistors 83 and 91 are continuously OFF. However, there is a short time illustrated by pulses 101 when all of the input signals are coincidently positive. During the time that all of the input signals are positive the potential of junction point 54 will rise so that base 56 of transistor 57 will go positive thereby switching transistor 57 ON. When transistor 57 switches ON, base 66 of transistor 67 is lowered in potential so that transistor 67 also switches ON. When transistor 67 switches ON, current flows from positive source 63 through resistor 71, transistor 67, and capacitor 97 and resistor 100 to ground 61 each of pulses 101 switches transistor 67 ON. Capacitor 97 and resistor 100 smooth pulses 101 to provide a DC output signal at terminal 24.

Figure 4C:
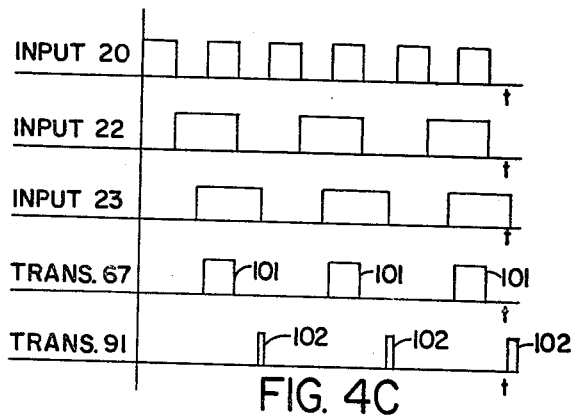

FIG. 4C illustrates the conditions which occur when the phase of the output signal of flip-flop 16 of counter 10 is lagging the phase of the input signal applied at input terminal 23 by more than 90°. Pulses 101 reach their maximum width at 90° phase error and are coincident with every other one of the pulses applied at input terminal 20. There was also a short time illustrated by pulses 102 when all of the input signals are coincidentally "0." During this time the potential drop across diodes 75–77 and 81 is sufficient to switch transistor 83 ON thereby switching transistor 91 ON. When transistor 91 switches ON, current flows from ground 61 through capacitor 97 and resistor 100, transistor 91, and resistor 93 to negative source 85. Thus, at 90° the positive output signal at terminal 24 is at a maximum. After the phase error exceeds 90° transistor 67 is switched ON for the same length time each cycle and transistor 91 is switched ON for increasingly greater times as the phase error increases. Thus, after the phase error exceeds 90°, the error signal at terminal 24 begins to decrease. The magnitude of the error signal will be explained more fully in connection with FIG. 4F.

Figure 4D:
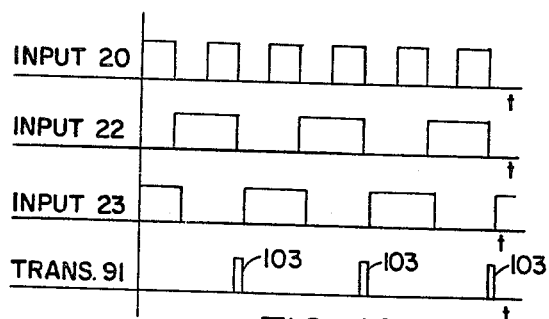

FIG. 4D shows the conditions which prevail when the phase of the output signal from flip-flop 16 is leading the phase of the input signal. Note that there is no time at which all of the signals applied to terminals 20, 22, and 23 are "1" so that transistor 57 does not switch ON. However, there is a short time illustrated by pulses 103 when all of the input signals are "0." During this time transistors 83 and 91 are switched ON to generate a negative output error signal at terminal 24.

Figure 4E:
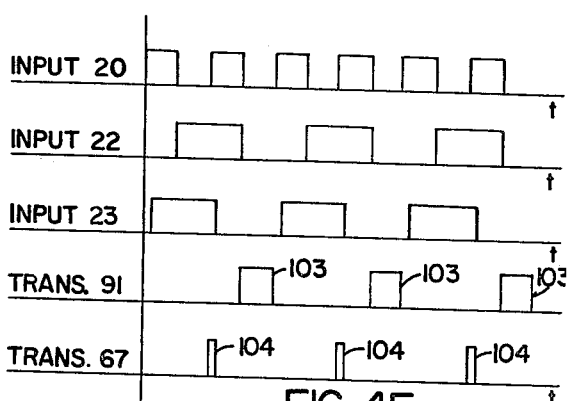

FIG. 4E illustrates the conditions which prevail when the phase of the output signal from flip-flop 16 leads the phase of the input signal by more than 90°. Pulses 103 reached their maximum width at 90° and do not increase with greater phase error. Thus, transistor 91 is ON for its maximum time at 90°. When the phase error exceeds 90°, pulses 104 begin to appear which illustrate the time during which transistor 67 is also switched ON. Thus, after the phase error exceeds 90° the negative signal at terminal 24 begins to increase toward zero.

Figure 4F:
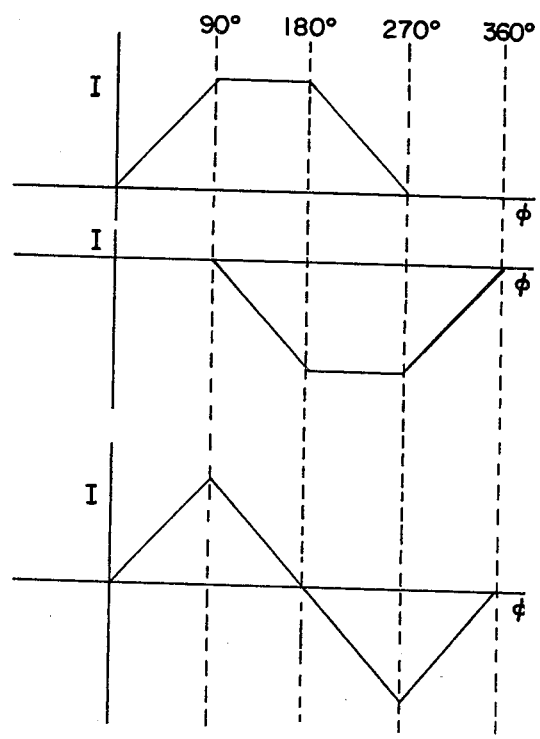

In FIG. 4F the output signal current at terminal 24 is plotted against the phase error. The top curve illustrates the output generated by transistor 67, the second curve illustrates the output generated by transistor 91, and the bottom curve illustrates the resultant output signal. Between 0° and 90° phase error the output signal increases linearly to a maximum at 90°. Between 90° and 180° phase error the output signal from transistor 57 remains constant and the output signal from transistor 91 increases in a negative direction. This results in an output signal which decreases linearly to zero at 180°. When the phase error is between 180° and 270° (which is the same as between −90° and −180°), the signal generated by transistor 67 decreases linearly with phase error while the output signal generated by transistor 91 is constant. This results in a linear decrease in output signal from zero at 180° to a maximum negative signal at 270°. Between 270° and 360° (which is the same as between 0° and −90°), transistor 67 does not provide any output signal while there is a linear increase in the output signal from transistor 91.

FIGS. 5A AND 5B

FIG. 5A is a circuit schematic of an integrator which can be used as integrator 26. FIG. 5B is a circuit schematic of a modification which can be used with FIG. 5A. Integrator 26 receives an error signal from terminal 24 and provides an output signal at terminal 27. Integrator 26 also receives a reset signal from terminal 31. Terminal 24 is connected by means of a resistor 105 to a first input 106 of an amplifier 107. Amplifier 107 has a second input 110 which is connected to a common conductor or ground 111 by means of a resistor 112. An output of amplifier 107 is connected to terminal 27 by means of a resistor 113. Terminal 27 is connected to input 106 of amplifier 107 by means of a serial combination of capacitors 114 and 115. Terminal 27 is further connected to terminal 24 by means of a feedback resistor 116.

A field effect transistor 117 is connected across capacitor 114 and a field effect transistor 120 is connected across capacitor 115. When one or both of FET's 117 and 120 are switched ON, the corresponding capacitors are discharged through the FET's.

Terminal 27 is connected to a junction point 121 by means of a resistor 122 and to a junction point 123 by means of a resistor 124. Junction point 121 is connected to a gate 125 of FET 117 and junction point 123 is connected to a gate 126 of FET 120. Junction point 121 is further connected to the anode of a diode 127 which has its cathode connected to the cathode of a diode 130. The anode of a diode 130 is connected to reset terminal 31. Junction point 123 is connected to the anode of a diode 131 which has its cathode connected to terminal 31. A terminal 132 is connected by means of a resistor 133 to an emitter 134 of a PNP transistor 135. Transistor 135 has a collector 136 which is connected to the cathodes of diodes 127 and 130. Collector 136 is further connected to a source of negative potential 137 by means of a resistor 140. A base 141 of transistor 135 is connected to ground 111.

Amplifier 107 may be a Fairchild μA 709 integrated circuit operational amplifier. FET's 117 and 120 may be Union Carbide transistors UC250.

When a positive input signal is applied at terminal 24, amplifier 107 provides a negative going output signal at terminal 27. This output signal is fed back to input 106 of amplifier 107 through capacitors 114 and 115 or one of them to provide a boot strap or integrating effect. Similarly, when a negative input signal is applied at terminal 24, a positive going signal is provided by integrator 26 at terminal 27.

The error signal decreases by a step voltage each time the counter is corrected by one count. This action would provide a step or staircase-like signal at terminal 24. To compensate for this signal a feedback signal is provided through resistor 116 to smooth the input signal to amplifier 107.

To understand the operation of the reset function of the integrator, first assume that the input signal at terminal 132 is either ground or slightly positive or open circuited so that transistor 135 is OFF. The negative potential of source 137 will be coupled through resistor 140 and diode 127 to gate 125 of FET 117. This negative potential will hold FET 117 in pinch-off thereby allowing capacitor 114 to charge. The signal from trigger 30 when trigger 30 is in its untriggered or initial condition is a negative voltage which is coupled to terminal 31. This negative voltage is coupled through diode 131 to gate 126 of FET 120 to hold FET 120 in pinch-off thereby permitting capacitor 115 to charge. Integrator 26 integrates until the output signal at terminal 127 reaches the above-mentioned predetermined level so that trigger 30 triggers.

When trigger 30 triggers, the potential at terminal 31 rises from a negative potential to approximately zero volts. The potential of gate 26 of FET 120 correspondingly rises so that FET 120 switches ON or conducting and discharges capacitor 115. The zero potential at terminal 31 is coupled through diode 130 to raise the potential of collector 136 of transistor 135. This potential is coupled through diode 127 to gate 125 of FET 117 to switch FET 117 ON and discharge capacitor 114. As capacitors 114 and 115 discharge, the potential at terminal 27 is brought toward zero volts and trigger 30 reverts to its initial condition. When trigger 30 reverts to its initial condition, the potential at terminal 31 returns to the negative voltage so that FET's 117 and 120 are again turned OFF and integrator 26 can start another cycle of operation.

As was mentioned above, the synchronizer can operate at more than one speed. This variable speed is obtained by varying the feedback capacitance of integrator 26. In actual practice capacitor 114 was selected to be much smaller than capacitor 115 so that when both capacitors were used in the feedback circuit, the effective combined capacitance of the feedback capacitors was approximately the capacitance of capacitor 114. Since capacitor 114 is small, the integrator gain is high and the output signal reaches the predetermined levels rapidly. To slow the integrator, a positive signal is applied to terminal 132 so that transistor 135 switches ON thereby raising the potential of collector 136. This potential is coupled through diode 127 to hold FET 117 continuously ON so that capacitor 114 cannot charge. The reset signal from trigger 30 now controls only FET 120 and capacitor 115 is the feedback capacitor. Since capacitor 115 is much larger than capacitor 114, the gain of integrator 26 will be lower and the output signal at terminal 27 will rise more slowly. From this description of two speed operation it is evident that additional feedback capacitors could be used to obtain a wide variety of integration rates so that a wide variety of speeds of operation of the synchronizer can be obtained.

In FIG. 5A no provision is shown for a hold input signal. Referring to FIG. 1, terminal 37 is connected to an input of integrator 26. This circuitry is shown in FIG. 5B. In FIG. 5B components which are the same as in FIG. 5A are numbered the same. The cathode of diode 142 is connected to the cathode of diode 131 and the anode of diode 142 is connected to terminal 31. Terminal 37 is connected by means of a resistor 143 to emitter 134 of transistor 135 and is further connected by means of a resistor 144 to an emitter 145 of a PNP transistor 146. A base 147 of transistor 146 is connected to ground 111 and a collector 150 of transistor 146 is connected by means of a resistor 151 to negative source 137. Collector 150 is further connected to the cathodes of diodes 131 and 142. When a ground or negative voltage is applied to terminal 37, transistor 146 will be OFF and the integrator will operate as before with the signal at terminal 31 controlling reset and the signal at terminal 132 controlling the speed of synchronization.

When the pilot desires to engage the autopilot, he closes a switch which applies a positive voltage to terminal 37. This positive voltage is a hold signal which switches transistors 135 and 146 ON so that FET's 117 and 129 are continuously ON and capacitors 114 and 115 are continuously shorted and integrator 26 cannot provide an output signal. Thus the synchronizer can no longer synchronize. The error signal at terminal 24 is coupled to the error output terminal 25 and is used to control the pitch attitude of the aircraft in a manner well known to those skilled in the art. Thus the error signal is used as a control signal during the hold mode of operation.

FIG. 6

In FIG. 6 terminal 27 is connected to a base 152 of an NPN transistor 153 by means of a resistor 154. Terminal 27 is further connected to a base 155 of an NPN transistor 156 by means of resistor 157. A collector 160 of transistor 153 is connected by means of resistor 161 to a source of positive potential 162. Source 162 is connected by means of a resistor 163 to a collector 164 of transistor 156 and by means of a resistor 165 to base 155. Collector 160 of transistor 153 is further connected by means of a resistor 166 to base 155 of transistor 156. Collector 164 of transistor 156 is connected by means of a resistor 167 to an anode of a diode 170. The cathode of diode 170 is connected to base 152 of transistor 153.

An emitter 171 of transistor 153 is connected to an emitter 172 of transistor 156. Emitters 171 and 172 are connected by means of a resistor 173 to a source of negative potential 174 and are further connected to the cathode of a diode 175. The anode of diode 165 is connected to a common conductor or ground 176. Base 152 of transistor 153 is further connected to the cathode of a diode 177, the anode of which is connected to ground 176. Base 152 is further connected by means of a resistor 180 to a junction point 181 which is further connected by means of a resistor 182 to negative source 174. Collector 160 of transistor 153 is connected to terminal 34 and collector 164 of transistor 156 is connected to terminal 35.

Collector 160 of transistor 153 is connected by means of a resistor 183 to a base 184 of an NPN transistor 185. Transistor 185 has an emitter 186 which is connected to ground 176. Base 184 of transistor 185 is connected to ground 176 by means of a resistor 187. A collector 190 of transistor 185 is connected to positive source 162 by means of a resistor 191 and is further connected by means of a resistor 192 to an emitter 193 of a PNP transistor 194. A base 195 of transistor 194 is connected to ground 176. A collector 196 of transistor 194 is connected by means of a resistor 197 to junction point 181 and is further connected to terminal 31. Collector 190 of transistor 185 is connected by means of a capacitor 200 to terminal 32. Terminal 32 is further connected by means of a resistor 201 to negative source 174 and to the cathode of a diode 202 which has its anode connected to ground 176. A terminal 37' which may be used as a hold input is connected by means of a resistor 203 to emitter 193 of transistor 194.

To understand the operation of FIG. 6 assume that the signal at terminal 27 is approximately ground potential. Current flows from ground 176 through diode 175 and resistor 173 to negative source 174. This current flow establishes a slightly negative potential on emitters 171 and 172. Current also flows from ground 176 through diode 177, resistor 180, and resistor 182 to negative source 174. This current flow establishes a slightly negative potential on base 152 of transistor 153 thereby holding transistor 153 OFF. The potential of positive source 162 is coupled through resistor 165 to base 155 of transistor 156 to hold transistor 156 ON. When transistor 153 is OFF, collector 160 is at a high potential thereby holding transistor 185 ON. Thus, the potential of collector 190 is low and the potential at terminal 32 is low or "0" as was described in accordance with FIG. 1. Similarly, the potential at terminal 34 is high or "1" and the potential at terminal 35 is low or "0."

The low potential at collector 190 of transistor 185 is coupled through resistor 192 to emitter 193 of transistor 194 to hold transistor 194 OFF. The negative potential of source 174 is coupled through resistors 182 and 197 to terminal 31 so that terminal 31 is negative.

Now assume that integrator 26 is providing a positive going signal at terminal 27. This positive going signal is coupled through resistor 154 to base 152 of transistor 153. However, the signal at terminal 27 must become sufficiently positive to overcome the negative bias on base 152 before transistor 153 will switch ON. The potential at terminal 27 which is sufficient to switch transistor 153 ON is the positive threshold level. When this threshold level is reached, transister 153 switches ON and collector 160 drops in potential so that transistor 185 switches OFF. When transistor 185 switches OFF, the potential of collector 190 and hence emitter 193 of transistor 194 rises so that transistor 194 switches ON. Current now flows from source 162 through resistor 191, resistor 192, transistor 194, resistor 197, and resistor 182 to negative source 74. This current flow establishes a potential of approximately zero volts at collector 196 of transistor 194 and at reset terminal 31. At the same time the potential of junction point 181 rises to a slightly negative potential. This rise in potential is coupled through resistor 180 to base 152 of transistor 153 so that transistor 153 remains ON. Note that a positive signal at terminal 27 does not affect the conduction state of transistor 156.

When transistor 194 switches ON to raise the potential of terminal 31, integrator 26 begins to reset. As the potential of terminal 27 begins to fall, transistor 153 remains ON until the potential at terminal 27 falls to a sufficiently low level so that the slightly negative potential of junction point 181 can switch transistor 153 OFF. In one practical embodiment of this invention, the positive threshold level of the circuit was five volts. In other words a potential of five volts at terminal 27 was necessary to switch transistor 153 ON. In the same embodiment, the potential at terminal 27 had to decrease to one volt positive before transistor 153 would switch OFF. When transistor 153 switches OFF, transistor 185 switches ON and transistor 194 switches OFF. The switching hysteresis introduced at base 152 of transistor 153 assures that the logic circuitry of FIG. 1 will have sufficient time to operate before trigger circuit 30 reverts to its initial condition.

The operation of the trigger circuit for positive output signals from integrator 26 is summarized as follows. When the input signal reaches five volts positive, transistor 153 switches ON, transistor 185 switches OFF, and transistor 184 switches ON. The potential of junction point 181 rises to induce hysteresis in the circuit so that transistor 153 will not switch OFF when the input signal at terminal 27 drops below five volts. When the decreasing input signal at terminal 27 reaches one volt positive, transistor 153 switches OFF, transistor 185 switches ON, and transistor 194 switches OFF.

Now assume that a negative going signal is present at terminal 27. This negative signal is coupled through resistor 157 to base 155 of transistor 156. When this signal becomes sufficiently negative, that is, reaches the threshold level, transistor 156 switches OFF since the negative current flowing out terminal 27 is sufficient to overcome the positive current flowing from source 162 through resistors 166 and 165. When transistor 156 switches OFF, the potential of collector 164 and hence base 152 of transistor 153 arises to switch transistor 153 ON. The remainder of the circuit operates as before, that is, transistor 185 switches OFF and transistor 194 switches ON. The potential of junction point 181 rises to latch transistor 153 ON. The potential of terminal 32 rises to a "1" level and the potential of terminal 34 drops to a "0" level. When transistor 156 switches OFF, the potential of terminal 35 rises to a "1." A reset signal is provided at terminal 31 to reset integrator 26. As the potential of terminal 27 rises, it reaches a potential sufficient for transistor 156 to switch ON thereby switching transistor 153 OFF, transistor 185 ON, and transistor 194 OFF. In the above mentioned practical embodiment, the negative threshold level was five volts negative and the circuit reverted to its initial state when the input signal rose to one volt negative.

In FIG. 6 terminal 37' is provided which can be used as an alternative to the hold circuit of FIG. 5B. If terminal 37' is used, the circuit of FIG. 5A is also used. To place the synchronizer in hold mode, a positive signal is coupled to terminal 37' which switches transistor 194 ON so that the continuous reset signal is provided on terminal 31 to continuously reset the integrator so that a null or zero signal is provided at terminal 27. However, note that the potential of junction point 181 will rise when transistor 194 is switched ON. This means that if there is a signal present at terminal 27 which is between one and five volts positive, transistor 153 will switch ON and the trigger will provide an additional retard signal. To prevent this additional retard signal from occurring, terminal 37' can be eliminated and the circuit of FIG. 5B can be used instead.

TRIM CONTROL

In the above referenced application a trim control circuit is shown. The purpose of a trim control circuit is to enable the pilot to adjust the stored information, which in this case is the phase of the counter, during the hold mode so that the pitch attitude of the airplane can be changed slightly while the autopilot is engaged. Furthermore, as was explained in the above referenced application, an automatic trim can be derived from the altitude signal since it is generally desired to maintain a constant altitude. If the altitude changes, it means that the pitch attitude is slightly in error. The altitude can also change due to fuel consumption which lightens the airplane. In any event, an altitude error signal can be derived which will adjust the phase of the counter slightly so that the pitch attitude is correspondingly adjusted to maintain a constant altitude.

In this invention the requirement for a separate trim control channel is eliminated since the trim control signal can be applied at terminal 23 in place of the ordinary pitch attitude input signal. In other words, circuitry can be provided to disengage the pitch attitude input signal from terminal 23 and engage a trim control signal. Simultaneously, the hold signal is removed from terminal 37 so that integrator 26 can integrate. The counter can be either advanced or retarded depending upon the polarity of the signal applied at terminal 23. Referring to FIGS. 3 and 4, it is evident that a continuous positive signal applied at terminal 23 will cause transistor 57 and transistor 67 to switch ON when counter 10 provides "1" input signals at terminals 20 and 22. Thus, a positive signal at terminal 23 will provide a positive signal at terminal 24 and to integrator 26. Alternatively, a ground signal signal can be applied at terminal 23 which will cause transistor 83 and transistor 91 to switch ON when counter 10 provides "0" signals at terminals 20 and 22. Thus, a ground signal at terminal 23 will provide a negative signal at terminal 24 and to integrator 26. Accordingly, this invention significantly lessens the amount of circuitry necessary by eliminating the requirements for a separate trim control channel.

While I have shown and described one embodiment of my invention, various modifications will be evident to those skilled in the art. Accordingly, I do not wish to be limited by the specific embodiment shown but only by the scope of the appended claims.

I claim as my invention:

1. Apparatus of the class described comprising, in combination:
    counter means for providing a signal;
    input means for providing an input signal;
    phase detecting means connected to receive said signal from said counter means and said input signal, said phase detecting means providing an error signal indicative of the phase difference between said signal from said counter means and said input signal;
    integrating means connected to said phase detecting means for receiving said error signal;
    trigger means connected to said integrating means for receiving signals therefrom, said trigger means providing first logic signals when the signals from said integrating means exceed a first threshold and second logic signals when the signals from said integrating means exceed a second threshold;
    clock means connected to said counter means whereby said counter means counts pulses from said clock means; and
    logic means connected to said trigger means and to said counter means, said logic means causing said counter means to skip at least one clock pulse upon the occurrence of one of said first logic signals from said trigger means and to advance at least one count upon the occurrence of one of said second logic signals from said trigger means.

2. Apparatus as defined in claim 1 wherein said integrating means is reset by a signal from said trigger means each time said trigger means provides said first and second logic signals and said integrating means includes at least two feedback capacitors at least one of which can be shorted by a switch means so that more than one integration rate is provided.

3. Apparatus as defined in claim 2 wherein reset means associated with said integrating means provides a continuous reset signal to said integrating means when said reset means is energized, and an output means is connected to said phase detecting means for receiving said error signal.

4. Apparatus as defined in claim 3 wherein said logic means includes gating means which inhibits the first stage of said counter means for one clock pulse upon the occurrence of one of said first logic signals and upon the occurrence of one of said second logic signals and causes the second stage of said counter means to count the one clock pulse during which the first stage is inhibited upon the occurrence of one of said second logic signals.

5. Synchronizer apparatus comprising, in combination:
adjustable storage means for generating first signals;
input means for providing a phase modulated input signal;
detecting means connected to said adjustable storage means and to said input means for providing an error signal indicative of the phase diffenence between said first signals and said input signal;
integrating means connected to said detecting means for integrating said error signal;
logic means connecting said interating means to said storage means for adjusting the phase of said first signals in accordance with the sense of said error signal whereby the phase of said first signals is adjusted to decrease said error signal; and
means connected to the synchronizer apparatus for inhibiting adjustment of the phase of said first signals.

6. Synchronizer apparatus as defined in claim 5 wherein said logic means includes discriminating means for providing second signals when a signal from said integrating means reaches a first predetermined level and for providing third signals when the signal from said integrating means reaches a second predetermined level, said logic means further providing reset signals to reset said integrating means opon the occurrence of said second and third signals, and gating means connected to said discriminating means and to said storage means for retarding the phase of said first signals upon the occurrence of said second signals and for advancing the phase of said first signals upon the occurrence of said third signals.

7. Synchronizer apparatus as defined in claim 5 wherein said adjustable storage means includes a counter means and a clock means whereby said counter means counts pulses from said clock means and the phase of said first signals is adjusted by causing said counter means to skip at least one of said pulses when the phase of said first signals is leading the phase of said input signal and by causing said counter means to count at least one of said pulses in a higher order stage when the phase of said first signals is lagging the phase of said input signal.

8. Synchronizer apparatus as defined in claim 7 wherein said logic means includes trigger means for providing second signals when a signal from said integrating means reaches a first predetermined level and for providing third signals when the signal from said integrating means reaches a second predetermined level, said logic means further providing reset signals to reset said integrating means upon the occurrence of said second and third signals, and gating means connected to said trigger means and to said counter means for inhibiting the first stage of said counter means for at least one pulse from said clock means upon the occurrence of one of said second signals and for causing the second stage of said counter means to count at least one pulse from said clock means upon the occurrence of one of said third signals.

9. Synchronizer apparatus as defined in claim 8 wherein said means for inhibiting adjustment of the phase of said first signals is connected to said integrating means and inhibit signals applied thereto cause said integrating means to provide a null signal.

10. A synchronizer apparatus comprising, in combination:
counter means having associated therewith a clock means which drives said counter means to provide a first signal nominally of a given frequency;
input means for providing an input signal nominally of said given frequency which is phase modulated in accordance with a given condition;
phase detecting means connected to said counter means and to said input means for providing an error signal indicative of the phase difference between said first signal and said input signal;
integrating means connected to said phase detecting means for integrating said error signal;
trigger means connected to said integrating means for providing second signals when a signal from said integrating means reaches a first threshold level and third signals when the signal from said integrating means reaches a second threshold level, said trigger means also providing a reset signal to reset said integrating means when each of said second and third signals occurs;
logic means including gating means connected to said trigger means and to said counter means for inhibiting counting by said counter means for at least one pulse from said clock means upon the occurrence of one of said second signals, for inhibiting counting by a first stage of said counter means for at least one pulse from said clock means upon the occurrence of one of said third signals, and for causing a second stage of said counter means to count at least one pulse from said clock means upon the occurrence of said one of said third signals;
means connected in operable relation with said integrating means for inhibiting said integrating means; and
means connected in operable relation with said integrating means for changing the rate of integration of said integrating means.

References Cited

UNITED STATES PATENTS

| | | | |
|---|---|---|---|
| 2,950,431 | 8/1960 | Wright. | |
| 3,046,416 | 7/1962 | Case | 307—262 XR |
| 3,088,041 | 4/1963 | Hinkein et al. | 307—269 XR |
| 3,091,737 | 5/1963 | Tellerman et al. | 328—72 |
| 3,116,456 | 12/1963 | Riker | 307—208 XR |
| 3,286,144 | 11/1966 | Hill. | |

JOHN S. HEYMAN, Primary Examiner

S. T. KRAWCZEWICZ, Assistant Examiner

U.S. Cl. X.R.

307—218, 229, 262, 269; 318—489; 328—127, 133, 155